United States Patent [19]

Haruta et al.

[11] 4,302,360
[45] Nov. 24, 1981

[54] CATALYST FOR CATALYTIC COMBUSTION OF HYDROGEN

[75] Inventors: Masatake Haruta, Ikeda; Hirosi Sano, Toyonaka; Tomizo Nakamura, Moriguchi, all of Japan

[73] Assignees: Agency of Industrial Science & Technology; Ministry of International Trade & Industry, both of Tokyo, Japan

[21] Appl. No.: 111,253

[22] Filed: Jan. 11, 1980

[51] Int. Cl.³ .............. B01J 23/34; B01J 23/50; B01J 23/68; B01J 23/74
[52] U.S. Cl. .................................. 252/471; 252/474
[58] Field of Search ............. 252/471, 474, 476; 422/222; 431/7, 268

[56] References Cited

U.S. PATENT DOCUMENTS 2,118,007   5/1938   Covert et al. .................. 252/474 X
3,458,535   7/1969   Gozzo et al. .................. 252/471 X Primary Examiner—W. J. Shine
Attorney, Agent, or Firm—Oblon, Fisher, Spivak, McClelland & Maier

[57] ABSTRACT

A catalyst for the catalytic combustion of hydrogen, comprising a composite oxide of silver and cobalt and/or manganese. The catalyst permits hydrogen to be burnt safely at low temperatures.

1 Claim, 7 Drawing Figures

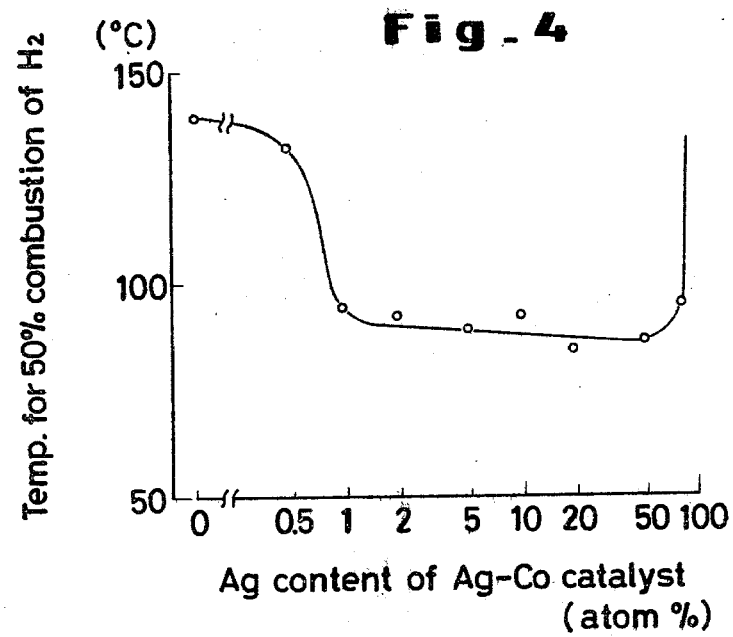
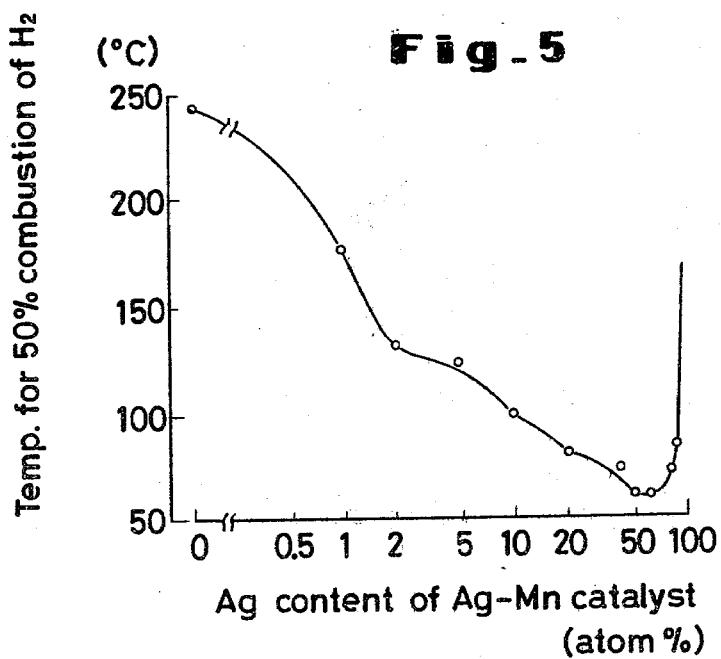

CATALYST FOR CATALYTIC COMBUSTION OF HYDROGEN

BACKGROUND OF THE INVENTION

This invention relates to a catalyst for the catalytic combustion of hydrogen. More particularly, this invention relates to an oxide catalyst which enables hydrogen to undergo complete combustion easily at a relatively low temperature whereat the combustion of hydrogen does not reach flame combustion.

Scientists know that humans will eventually have to stop relying on fossil fuels and have long been giving attention to hydrogen as a fuel that shows every promise of being accepted for large-scale use by the general public in the future.

It has been found by the present inventors that when the amount of air pre-mixed hydrogen is small, the combustion gives rise to a large amount of nitrogen oxides ($NO_x$). When the amount of pre-mixed air is large, the combustion suffers from the phenomenon of backfire even though the $NO_x$ emission level is markedly reduced. Thus, it has been found very difficult to obtain safe combustion of hydrogen without entailing the danger of air pollution.

For the purpose of eliminating this difficulty and in due consideration of the fact that hydrogen is more readily combustible than any other fuel, attempts have been made to develop a catalyst which enables combustion of hydrogen to proceed safely at low temperatures. Test results have been ascertained that catalysts of platinum-group metals are most effective in realizing such ideal combustion of hydrogen. Unfortunately, platinum-group metals are very expensive and are not likely to be available in quantities that fill the demand when catalytic heaters using hydrogen have come into use on an extensive scale.

It has been ascertained, on the other hand, that some of the oxides of transition metals which are inexpensive and readily available can be used as catalysts for the catalytic combustion of hydrogen, although they are inferior to the platinum-group metals in catalytic activity. Silver oxide exceeds all the other oxides of transition metals in terms of the magnitude of initial catalytic activity. Once it is exposed to a temperature exceeding 150° C., however, it is partially decomposed to silver and consequently loses its catalytic activity almost completely.

An object of this invention is to provide a catalyst for the catalytic combustion of hydrogen which is capable of exhibiting high catalytic activity over a wide range of temperatures from low to high degrees.

Another object of this invention is to provide a catalyst for the catalytic combustion of hydrogen, which comprises materials inexpensive and available virtually inexhaustibly.

SUMMARY OF THE INVENTION

To accomplish the objects described above according to the present invention, there is provided a catalyst for the catalytic combustion of hydrogen, which comprises a composite oxide of cobalt and/or manganese and silver.

The catalyst mentioned above manifests its full effect even when the amount of silver incorporated therein is as small as 1 atom%. This means that, in the preparation of the catalyst, the consumption of relatively expensive silver oxide can be reduced and, therefore, that the overall production cost of this catalyst is low. Besides, the catalyst excels in thermal stability so that even when the temperature of the catalyst is raised locally to 600° C. owing to the combustion of hydrogen, the loss of catalytic activity is negligibly small.

The other objects and characteristics of the present invention will become apparent from the further disclosure of the invention to be given hereinafter with reference to the accompanying drawings.

BRIEF EXPLANATION OF THE DRAWING

FIG. 4 is a graph showing the relation between the content of silver of the Ag—Co catalyst according to the present invention and the temperature for 50% combustion of hydrogen.

FIG. 5 is a graph showing the relation between the silver content of the Ag—Mn catalyst according to the present invention and the temperature for 50% combustion of hydrogen.

DESCRIPTION OF THE PREFERRED EMBODIMENT

Figure 1:
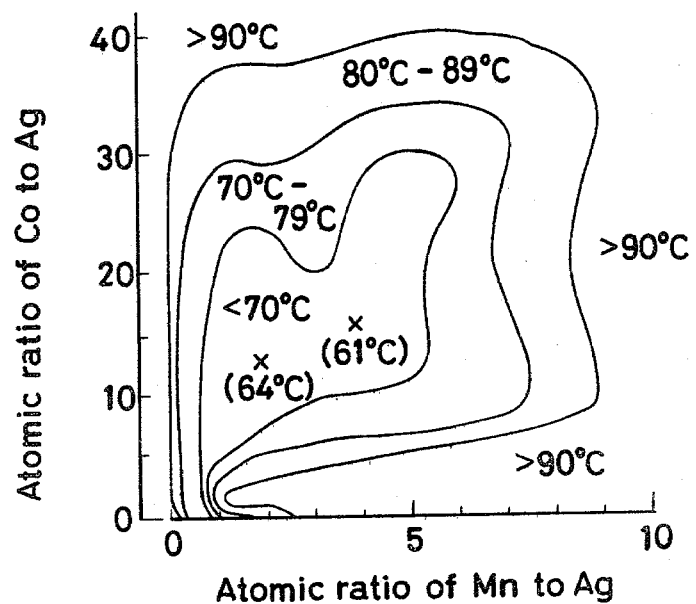
FIG. 1 is a contour map showing the relation between the contents of the component elements in the Ag—Co—Mn catalyst according to the present invention and the temperature for 50% combustion of hydrogen.

The knowledge that hydrogen is more readily combustible than any other fuel has made researchers seek ways of producing safe combustion of hydrogen at low temperatures by use of a catalyst. Platinum-group metals are effective in catalyzing the combustion of hydrogen but are prohibitively expensive. Thus, there has developed a need of developing similarly effective catalysts consisting of inexpensive oxides which can take the place of platinum-group metals. Among the promising oxide catalysts, the silver oxide catalyst exhibits a high initial activity. However, once the temperature of this catalyst rises above 150° C. while it is used in the combustion, the catalyst is partially decomposed into silver and, consequently, has its catalytic activity seriously degraded.

The inventors conducted a study and experiments on silver oxide with a view to developing a formulation which enables silver oxide to retain its high catalytic activity on the combustion of hydrogen without entailing any loss in the activity due to thermal decomposition. They have consequently made a discovery that silver oxide, when used in combination with at least one metal oxide selected from the group consisting of cobalt and manganese, retains its high catalytic activity intact even if the temperature of hydrogen combustion ex- } ceeds 300° C. This invention has issued from this discovery.

The oxides of silver, cobalt and manganese which are used as the components of the catalyst of the present invention are those represented chemically by the respective molecular formulas $Ag_2O$, $Co_3O_4$ and $MnO_2$.

Now, the method by which the catalyst of this invention is prepared will be specifically described. The Ag—Co catalyst is obtained by mixing an aqueous solution of silver nitrate with an aqueous solution of a water-soluble salt of cobalt such as cobalt chloride, cobalt sulfate or cobalt nitrate, adding to the mixed aqueous solution an aqueous solution of a neutralizing agent such as alkali carbonate, alkali hydroxide or ammonia thereby inducing a reaction and consequently causing coprecipitation of neutralized salts, and calcining the coprecipitate in air.

From the mixed aqueous solution in which the neutralized salts have been coprecipitated as described above, the Ag—Co—Mn catalyst is obtained by mixing an aqueous solution of alkali hydroxide containing hypochlorous acid, chloric acid or bromic acid ions and permanganic acid ions with an aqueous solution of a water-soluble salt of manganese such as manganese sulfate or manganese nitrate thereby converting divalent manganese ions into tetravalent manganese ions, adding the resultant mixed aqueous solution to the aforementioned coprecipitate-containing mixed aqueous solution thereby causing manganese dioxide to be precipitated on the coprecipitate of neutralized salts, washing the composite coprecipitate thoroughly with water and separating it through filtration, drying the separated coprecipitate and calcining it. The precipitation of manganese oxide may otherwise be accomplished by using a permanganate in place of the aforementioned aqueous solution of divalent manganese ions and effecting the reduction of the salt formalin or methanol, for example, by following the same procedure.

Alternatively, the Ag—Co—Mg catalyst can be obtained by adding to a mixed aqueous solution of silver nitrate and the aforementioned water-soluble salts of cobalt and manganese a mixed aqueous solution of an oxidizing agent such as potassium permanganate, sodium hypochlorite or sodium bromate and the aforementioned neutralizing agent and calcining the resultant precipitate.

The Ag—Mg catalyst can be produced by omitting the addition of the aqueous solution of cobalt salt from the aforementioned procedure followed in the preparation of the Ag—Co—Mn catalyst described above. To be specific, this catalyst is obtained by causing the precipitation of manganese dioxide by either converting positive divalent manganese ions to positive tetravalent manganese ions with an aqueous solution of alkali hydroxide containing hypochlorous acid, chloric acid or bromic acid ions and permanganic acid ions or using a permanganate in place of the water-soluble salt of positive divalent manganese and effecting the reduction of the salt with formalin or methanol and, simultaneously with or subsequently to the precipitation of manganese dioxide, causing precipitation of silver hydroxide or silver carbonate in an aqueous solution of silver nitrate by use of an aqueous solution of alkali hydroxide or alkali carbonate, separating the precipitates from the resultant mixed aqueous solutions, mixing the precipitates and calcining the mixed precipitate.

A catalyst in which silver oxide, cobalt oxide and manganese oxide are contained in desired proportions can be obtained by causing silver, cobalt and manganese to be precipitated in prescribed amounts in separate aqueous solutions, mixing the precipitates, washing the mixed precipitate with water, drying the washed mixture and then calcining it.

The calcining of the precipitate is made at a temperature within the range of from 300° to 600° C. for three to 24 hours in the presence of air. Optionally, the precipitate may be finely divided before it is calcined.

The finely divided catalyst obtained as described above may be directly placed to fill the burner or heater used for the catalytic combustion of hydrogen or it may be deposited on a carrier such as of asbestos, ceramic wool, ceramic foam, foamed metal or sintered metal and put to use as supported on the carrier. In the composition of the catalyst of the present invention, the amount of silver relative to that of cobalt is small (about 1 atom%). This catalyst exhibits an initial activity equivalent to the initial activity produced by a catalyst made solely of silver oxide. The initial activity of this catalyst increases to exceed that of the AgO catalyst as the amount of silver is increased from the level mentioned above.

The expression "atom%" as used in the present specification means the percentage of the number of atoms of a given element present in the catalyst based on the number of atoms of all the metal elements making up the catalyst $$\left( \frac{\text{Number of atoms of a given element in the catalyst}}{\text{Number of atoms of all the metal elements making up the catalyst}} \times 100 \right).$$

To be more specific, the catalyst of this invention exhibits its effective catalytic activity insofar as the silver content in the catalyst falls within the range of from 1 to 90 atom%. From the economic point of view, the silver content is desired to be as small as permissible. The practical range of the silver content, therefore, is from 1 to 50 atom%. In the Ag—Co—Mn catalyst, the composition ratio of cobalt to manganese is such that cobalt accounts for not less than 50 atom%.

A contour map of the temperature of catalyst for 50% combustion of hydrogen in the presence of the ternary catalyst is shown in FIG. 1. The values indicated in the spaces between the adjacent curves represent temperatures of the combustion involving fractions of the unit of 10° C. above the indicated values. In the graph, the horizontal axis is graduated for the amount of manganese added (atom ratio) relative to silver and the vertical axis for the amount of cobalt (atom ratio) relative to silver respectively.

It is noted from FIG. 1 that, in the case of a catalyst containing the three elements in amounts such that the atomic ratio of manganese to silver falls within the range of from about 0.5 to 5.0 and that of cobalt to silver within the range of from about 10 to 25, the temperature for 50% combustion of hydrogen is lower than 70° C., indicating that this catalyst equals a supported platinum-group metal catalyst with a small metal loading in activity. Incidentally, in the case of a catalyst made solely of silver oxide, the temperature for 50% combustion of hydrogen falls in the neighborhood of 90° C.

The expression "temperature of catalyst for 50% combustion of hydrogen" as used in the present specification means the temperature of a given catalyst which is required for effecting combustion of 50% of the hydrogen contained at a concentration of 1% by volume in air when this air is fed to the burner at a space velocity of $2 \times 10^4$ ml/g·hr. Hereinafter, this expression will be shortened to "temperature for 50% combustion" for the sake of simplicity (refer to Example 2).

With the catayst of the present invention, therefore, complete combustion of hydrogen can be obtained at a temperature below 100° C. The catalyst permits safe and efficient combustion of hydrogen in a wide temperature range of from 100° to 400° C. without the danger of air pollution or backfire.

The conventional catalyst which is made solely of silver oxide without any treatment of calcination and used for the catalytic combustion of hydrogen is substantially inactivated at a temperature above 150° C. despite its high initial activity. Silver oxide which has undergone a preliminary treatment of calcination at 300° C. exhibits virtually no catalytic activity. By contrast, the oxide catalyst of the present invention acquires a high initial activity even when it undergoes a treatment of calcining at a temperature within the range of from 300° to 600° C. and retains its high activity when the temperature of the catalyst required for the combustion of hydrogen stays over the level of 400° C.

A possible reason for this thermal stability of the catalyst may be that the initial activity proper to silver oxide appears in consequence of the incorporation of a small amount of silver oxide and the outstanding catalysis effected in the catalytic combustion of hydrogen results from the synergistic combination of the merits of cobalt oxide and manganese oxide owing to the coexistence of cobalt oxide which possesses relatively high thermal stability and manganese oxide and acquires high catalytic activity in the presence of silver oxide.

Now, a hydrogen burner which uses the catalyst of this invention will be described with reference to FIGS. 2 and 3.

Figure 2:
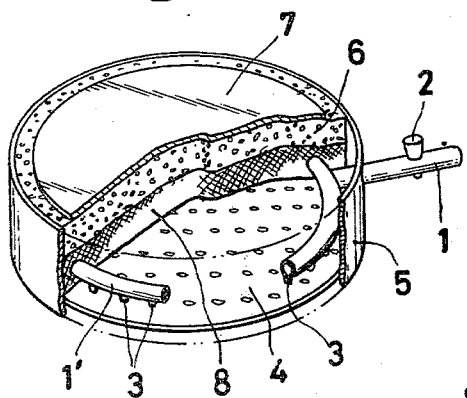
FIG. 2 is a schemaic view showing one embodiment of a kitchen hydrogen burner using the catalyst of the present invention.

FIG. 2 represents a kitchen burner for catalytic combustion of hydrogen. On the upper side of a circular burner proper 5, a metallic radiator plate 7 is provided. On the bottom side of the burner proper, a perforated plate 4 adapted to admit air to the burner proper is formed. A hydrogen feed tube 1 which is provided with a valve 2 serving to control the flow rate of hydrogen through the tube terminates in an annular tube 1' disposed within the burner proper 5. A plurality of nozzles 3 for projecting hydrogen are formed on the underside of this annular tube 1'. A ceramic wool 8 impregnated with platinum, which acts as a pre-heater of an oxide catalyst layer, is optionally disposed opposite the surface of the annular tube containing the aforementioned nozzles 3. The space intervening between the ceramic wool bed and the metallic radiator plate within the burner proper 7 is filled with a catalyst 6. The catalyst in its original form of pellets may be placed and retained in position by a suitable method so as not to fall down. For the convenience of handling, it may be supported on a suitable carrier and set in position inside the burner.

In the burner of the construction described above, valve 2 is opened so much as to start the flow of hydrogen at a prescribed flow rate into the burner proper 5. The hydrogen, on entering the oven proper, diffuses itself within the ceramic wool 8 and begins to burn upon contact with air. The heat generated by the combustion of hydrogen elevates the temperature of the catalyst bed 6. When the temperature of the catalyst bed reaches a prescribed level, hydrogen begins to burn within the catalyst bed. Within about 3 minutes after the start of the delivery of hydrogen to the burner, the temperature of the metallic radiator plate reaches about 260° C. The amount of heat generated by this plate is about 500 Kcal/hr where the metallic radiator plate 7 has a diameter of 20 cm.

Figure 3:
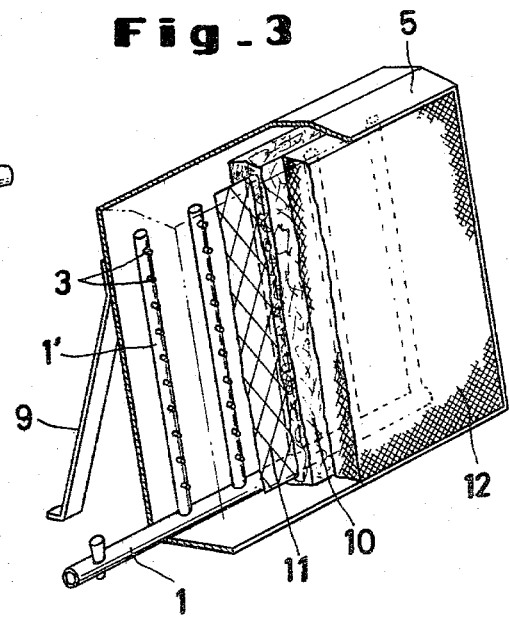
FIG. 3 is a schematic view showing one embodiment of a space heater using the catalyst of the present invention.

FIG. 3 represents a space heater using the catalyst of this invention. Inside the heater proper 5 which stands up from a stand 9, a hydrogen feed tube 1' in the heater proper is distributed in the shape of comb teeth. The unit tubes making up the hydrogen feed tube are each provided with a plurality of nozzles 3 for projecting hydrogen. A ceramic wool bed 10 adapted to facillitate smooth diffusion of hydrogen is disposed opposite the front side of the hydrogen feed tube. An electric heater wire 11 for preheating the catalyst bed 12 is disposed inside the ceramic wool bed 10. The catalyst bed 12 which is disposed on the front side of the ceramic wool bed concurrently serves as a radiator. This catalyst bed may be in a construction wherein the catalyst is supported on foam nickel, for example.

In the space heater of the construction described above, the ceramic wool bed 10 is preheated with the electric heater wire 11 and then the valve 2 is opened to have hydrogen projected through the nozzles 3. The hydrogen comes into contact with air within the catalyst bed 12 and begins to burn. When the radiator plate has an effective area of 50 cm × 50 cm and the hydrogen is fed at a flow volume of 17 lit./min., for example, the temperature of the radiator plate is elevated to a degree within the range of from 200° to 250° C. and the heat output reaches about 4000 Kcal/hr., though the temperature values are variable to some extent depending on the position of the catalyst bed.

As is plain from the description given above, the catalyst of the present invention for the catalytic combustion of hydrogen exhibits a catalytic activity much higher than the catalytic activity produced by a catalyst made solely of silver oxide. It further permits the silver content to be freely selected in a proper range to suit the particular purpose of combustion. Thus, it can be obtained at a low production cost. Owing to the coexistence of silver oxide with cobalt oxide and/or manganese oxide, the catalyst enjoys improved thermal stability and, therefore, permits hydrogen to be burnt safely without entailing the possibility of air pollution or backfire. The burner incorporating the catalyst of this invention can be used as space heaters and kitchen burners of varying designs or utilized for drying and heating processes in the food and pharmaceutical industries.

Now, the present invention will be described specifically with references to examples. It should be noted that this invention is not limited in any way by these examples.

EXAMPLE 1

To 1000 ml of a mixed aqueous solution of 233 g of hexahydrated cobalt chloride and 3.4 g of silver nitrate, 2000 ml of an aqueous 1.1 mol% sodium hydroxide solution was added while under continued agitation over a period of about 20 minutes. The agitation was continued for about two hours after the addition was completed. The precipitate which was consequently formed was thoroughly washed by decanting the solution five times and then separated by filtration. The filtrate was dried at 120° C. for 12 hours, then crushed and calcined under the flow of air at 400° C. for four hours. Thus, 73 g of a cobalt oxide-silver oxide catalyst (98:2 atom%) was obtained.

EXAMPLE 2

The procedure of Example 1 was followed by using hexahydrated cobalt chloride and silver nitrate in amounts calculated so as to produce catalysts having silver oxide contents of 0.5, 10, 50 and 90 atom%. The catalysts were tested for activity on the catalytic combustion of hydrogen (through determination of temperature for 50% combustion of hydrogen). The results were as shown in Table 1. The value of activity obtained similarly by using a catalyst formed solely of cobalt oxide is shown in the Table for the purpose of comparison.

The activity on the catalytic combustion of hydrogen, given in terms of "temperature for 50% combustion of hydrogen" was determined by feeding a mixed gas consisting of air and 1% by volume of hydrogen at a space velocity of $2 \times 10^4$ ml/g·hr to a 0.30 g bed of a given catalyst having a particle size of 42–70 mesh held inside a container which could be kept cooled with liquefied nitrogen when required and provided with piping adapted to permit chromatographic analysis of the gas discharged from the container, elevating the temperature of the catalyst bed to successively higher degrees while continuing the chromatographic analysis of the discharged gas, and finding the temperature at which the hydrogen content of the gas consisting of air and 1% by volume of hydrogen to be discharged was reduced by one half (temperature for 50% combustion of hydrogen).

TABLE 1

| Oxide | Silver oxide content (atom %) | Temperature for 50% combustion of hydrogen (°C.) |
| --- | --- | --- |
| $Co_3O_4$ | 0.5 | 132 |
| " | 1 | 94 |
| " | 10 | 93 |
| " | 50 | 87 |
| " | 90 | 95 |
| $Co_3O_4$ | 0 | 146 |

It is clear from Table 1 that the temperatures for 50% combustion of hydrogen obtained for the catalysts of the present invention were notably lower than the temperature obtained for the catalyst formed solely of cobalt oxide and that the temperatures fell in the neighborhood of 90° C. when the silver oxide content exceeded 1%.

EXAMPLE 3

Finely divided catalysts containing silver oxide in varying concentrations were obtained by following the procedure of Example 1, except that hexahydrated cobalt chloride and silver nitrate were used in varying amounts and the precipitates produced consequently were dried and then calcined at 400° C. for four hours and crushed to a particle size of 42 to 70 mesh. Each catalyst was tested for activity on the catalytic combustion of hydrogen by generally following the procedure of Example 2. The results were as shown in FIG. 4. It is clear from the graph of FIG. 4 that the temperatures for 50% combustion of hydrogen obtained with the catalysts having silver contents over 1% invariably fell in the neighborhood of 90° C. and that the values of temperature were virtually constant until the silver content exceeded about 90 atom%.

EXAMPLE 4

Catalytic combustion of hydrogen was carried out by using a silver oxide-cobalt oxide catalyst (5:95 atom%) prepared by following the procedure of Example 1. A burner without a ceramic wool pre-heater of the construction illustrated in FIG. 2 was used.

When a mixed gas consisting of air and 10% by volume of hydrogen was passed at a space velocity of $10^4$ ml/g·hr over a 20 g bed of the catalyst having a particle size of 8 to 10 mesh, hydrogen began to burn at about 50° C. and the temperature of the catalyst bed rose to 190° C.

While this condition was maintained for about one hour, the ratio of hydrogen combustion remained at 99.9%.

Then, the space velocity of the mixed gas was lowered to $5 \times 10^3$ ml/g·hr. Consequently, the temperature of the catalyst bed fell to 140° C. and remained constantly at this temperature. Again in this case, combustion of hydrogen was effected substantially completely.

When the case velocity of the mixed gas was raised to $10^4$ ml/g·hr again, the temperature of the catalyst bed rose again to 190° C. and the catalyst bed remained constantly at this temperature. In this case, the ratio of hydrogen combustion exceeded 99.9%.

When a catalyst formed solely of cobalt oxide was tested under the same conditions as described above by way of comparison, combustion of hydrogen did not begin until the temperature was raised to 95° C.

EXAMPLE 5

To 2000 ml of a mixed aqueous solution of 103 g of hexahydrated manganese nitrate and 68 g of silver nitrate, 2000 ml of a mixed aqueous solution of 77 g of sodium hydroxide and 38 g of potassium permanganate was added while under continued agitation at 60° C. over a period of about 40 minutes. The agitation of the mixture was further continued for about two hours after the addition was completed. The precipitate which was consequently produced was thoroughly washed with water by decanting the solution several times and separated by filtration. The precipitate thus obtained was dried at 120° C. for 12 hours, then crushed and calcined under a flow of air at 400° C. for four hours. Consequently, there was obtained 89 g of a silver oxide-manganese oxide catalyst (40:60 atom%).

EXAMPLE 6

Four Ag—Mn catalysts having different silver oxide contents were prepared by following the procedure of Example 5 and using hexahydrated manganese nitrate and silver nitrate in respectively calculated amounts. They were tested for temperature for 50% combustion of hydrogen. The results were as shown in Table 2. For the purpose of comparison, the value obtained by using a catalyst formed solely of manganese oxide is shown in the Table. The determination was made by the method described in Example 2.

TABLE 2

| Oxide | Silver oxide content (atom %) | Temperature for 50% combustion of hydrogen (°C.) |
| --- | --- | --- |
| $MnO_2$ | 1 | 177 |
| " | 10 | 126 |
| " | 50 | 61 |
| " | 80 | 75 |

TABLE 2-continued

| Oxide | Silver oxide content (atom %) | Temperature for 50% combustion of hydrogen (°C.) |
|---|---|---|
| MnO$_2$ | 0 | 244 |

It is clear from 2 that the temperature for 50% combustion of hydrogen obtained for the catalysts of the present invention were notably lower than the temperature similarly obtained for the catalyst of manganese oxide containing absolutely no silver oxide and that particularly in the case of the catalyst having a silver oxide content of 50 atom%, the temperature was about 60° C., namely about 30° C. lower than the temperature obtained of the uncalcined catalyst solely of silver oxide, suggesting that this catalyst possessed very high activity.

EXAMPLE 7

By following the procedure of Example 5, Ag—Mn catalysts having silver contents ranging from 0 to 90 atom% were prepared.

Each catalyst was tested for temperature for 50% combustion of hydrogen by feeding a mixed gas consisting of air and 1% by volume of hydrogen at a flow rate of 100 ml/min. to 0.3-g bed of the catalyst under the conditions similar to those of Example 2. The results were as shown in the graph of FIG. 5.

The catalysts were obtained by calcining the corresponding precipitates at 400° C. for four hours and crushing them each to a particle size of 42 to 70 mesh.

It is clear from FIG. 5 that the temperature of catalysts for 50% combustion of hydrogen sharply declined as the silver content of the catalyst increased. The temperatures were invariably below 100° C. when the silver contents were in the range of from 20 to 98 atom%.

EXAMPLE 8

A burner of the construction illustrated in FIG. 2 was packed with 20 g (8 to 10 mesh) of a silver oxide-manganese oxide catalyst (50:50 atom%) prepared by following the procedure of Example 5. When a mixed gas consisting of air and 10% by volume of hydrogen was fed at a space velocity of $10^4$ ml/g·hr to the burner, combustion of hydrogen began at about 30° C. and the temperature of the catalyst bed rose to 190° C. While this condition was maintained for about one hour, the ratio of hydrogen combustion remained constantly at 99.9%.

When the space velocity of the mixed gas was lowered to $3 \times 10^3$ ml/g·hr, the temperature of the catalyst bed fell to 125° C. and remained steady at this temperature. At this time, hydrogen was burnt substantially completely. When the space velocity of the mixed gas was increased to $1.5 \times 10^4$ ml/g·hr, the temperature of the catalyst bed rose to 230° C. and the catalyst bed remained constantly at this temperature. Again in this case, the ratio of hydrogen combustion remained over 99.9%.

When a catalyst of manganese dioxide containing absolutely no silver was tested under the same conditions as described above by way of comparison, combustion of hydrogen did not begin until the temperature was elevated beyond 160° C.

EXAMPLE 9

To 1000 ml of a mixed solution of 8.5 g of silver nitrate and 239 g of hexahydrated cobalt nitrate, 2000 ml of an aqueous 1.0 mol% sodium hydroxide solution was added while under continued agitation over a period of about 20 minutes. The agitation of the resultant mixture was further continued for about two hours after the addition was completed.

The precipitate which was consequently produced was thoroughly washed with water by decanting the mixed solution seven times and separated by filtration.

Separately, to 500 ml of an aqueous solution of 32 g of tetra- to hexahydrated manganese sulfate, 500 ml of an aqueous nitric acid solution containing 0.30 mol of sodium chlorate was added while under continued agitation at 90° C. over a period of about 40 minutes. The agitation of the resultant mixture was further continued for about two hours after the addition was completed. The precipitate which was consequently formed was washed with water by decanting the mixed solution seven times and separated by filtration.

The two precipitates obtained as described above were blended, dried at 120° C. for 12 hours, then crushed and calcined under a flow of air at 400° C. for four hours. Consequently, there are obtained 77 g of a finely divided catalyst consisting of the oxides of silver, cobalt and manganese (5:82:13 atom%).

From the ternary catalyst mentioned above, a 20-g portion of a particle size of 8 to 10 mesh was sifted out. The catalyst particles were placed in a burner without a ceramic pre-heater of the construction of FIG. 2. When a mixed gas consisting of air and 10% by volume of hydrogen was fed to the burner at a space velocity of $10^4$ ml/g·hr. and the temperature of the catayst bed was raised to about 30° C., hydrogen began to burn and the temperature of the catalyst bed rose to 190° C.

While this condition was maintained for about one hour, the ratio of hydrogen combustion remained over 99.9%.

When the space velocity of the mixed gas was lowered to $3 \times 10^3$ ml/g·hr, the temperature of the catalyst bed fell to 125° C. and remained steady at this temperature. Again in this case, hydrogen was burnt substantially completely.

When the space velocity of the mixed gas was again elevated to $10^4$ ml/g·hr, the temperature of the catalyst bed rose again to 190° C. and the catalyst bed remained steady at this temperature. In this case, the ratio of hydrogen combustion remained above 99.9%. When a catalyst formed of cobalt oxide and manganese oxide (86:14 atom%) was tested under the same conditions as described above, hydrogen did not begin to burn until the temperature was elevated to 130° C. or over.

EXAMPLE 10

By following the procedure of Example 9, ternary catalysts containing cobalt oxide and manganese oxide at a fixed atomic ratio of 80:20 and further containing silver oxide at varying atomic ratios were prepared and tested for temperature for 50% combustion of hydrogen. The catalysts were obtained by drying the respective precipitates, then calcining the dried precipitates at 400° C. for four hours and crushing them each to a particle size of 40 to 70 mesh. The temperature for 50% combustion of hydrogen was determined by feeding a mixed gas consisting of air and 1% by volume of hydrogen to a 0.3-g bed of a given catalyst. The results were as shown in the graph of FIG. 6.

Figure 6:
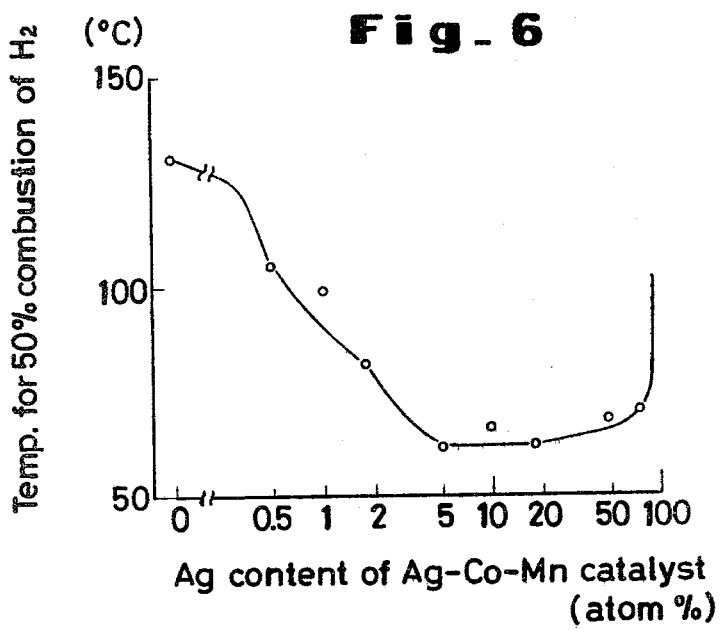
FIG. 6 is a graph showing the relation between the silver content of the Ag—Co—Mn catalyst according to the present invention and the temperature for 50% combustion of hydrogen.

It is clear from the graph of FIG. 6 that the temperature for 50% combustion of hydrogen was lowered by the incorporation of silver oxide. Virtually no change in the temperature was observed when the silver oxide content increased beyond 5 atom%. In view of this fact and in due consideration of the relatively high cost of silver, it is readily appreciated that the catalyst of this invention which exhibits high catalytic activity even with a low silver content enjoys notably high practical utility.

A catalyst having the same composition as that of the catalyst including 5 atom% of Ag shown in FIG. 6 was calcined for 24 hours. The catalyst thus obtained was tested for temperature for 50% combustion of hydrogen. The temperature was about 62° C. which was substantially the same as that in the calcination for four hours.

The catalyst subjected to calcination at 700° C. for 24 hours was tested for temperature for 50% combustion of hydrogen. The temperature was about 73° C. It was found that the catalyst was excellent in thermal stability.

EXAMPLE 11

By following the procedure of Example 9, ternary catalysts having a fixed silver content of 5 atom% and containing cobalt and manganese at varying atomic ratios were prepared and tested for temperature for 50% combustion of hydrogen. The results were as shown in the graph of FIG. 7.

Figure 7:
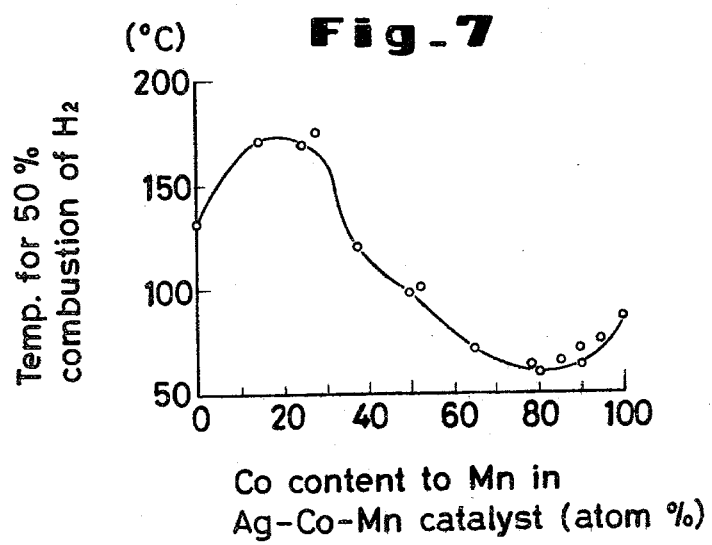
FIG. 7 is a graph showing the relation between the cobalt content of the Ag—Co—Mn catalyst according to the present invention and the temperature for 50% combustion of hydrogen.

It is clear from FIG. 7 that the catalytic activity notably increased as the cobalt content increased above 30 atom%.

EXAMPLE 12

A Ag—Co—Mn catalyst (4:83:13 atom%) prepared by following the procedure of Example 9 was finely divided to a particle size finer than 200 mesh. A 10-g portion of the resultant powder was uniformly stirred with 100 ml of an aqueous 10% alumina sol solution and a small amount of a non-ionic surface active agent. The resultant mixture was spread with a brush three times on a foam ceramic. The catalyst thus deposited on the foam ceramic carrier was dried at 120° C. for 12 hours and then burnt under air at 600° C. for five hours. Consequently there was obtained a catalyst deposited on the foam ceramic.

The same catalyst deposited on a metal foam carrier was obtained by following the procedure described above, except that a foam nickel metal was used in place of the foam ceramic.

EXAMPLE 13

A Ag—Co—Mn catalyst (5:82:13 atom%) prepared by the procedure of Example 9 was finely divided to a particle size finer than 300 mesh. A 5-g portion of the powdered catalyst was uniformly agitated with 200 ml of an aqueous 5% alumina sol solution and a small amount of a non-ionic surface active agent. A ceramic wool was immersed in the resultant mixed solution and then agitated therein for three hours. At the end of the agitation, the ceramic wool was removed from the mixed solution, then shaped in the form of mat, dried at 120° C. for 12 hours and burnt under air at 600° C. for 10 hours. Consequently, there was obtained a mat-shaped catalyst bed the matric of which was the ceramic wool.

The space heater shown in FIG. 3 was filled with 150 g of the mat-shaped bed thus obtained. When hydrogen was fed at a flow rate of 15 l/min. to the space heater, combustion of hydrogen began at about 40° C. and in about five minutes the temperature of the catalyst bed rose to about 200° C., with the result that hydrogen was subjected to complete diffusive combustion and the catalyst bed remained constantly at this temperature.

After two hours of operation at complete combustion of hydrogen, the supply of hydrogen gas was stopped and after two more hours had passed the supply of hydrogen gas was resumed. After such alternate supplying and stopping of hydrogen gas had been effected ten times or so, the time for the hydrogen to reach the state of complete combustion became slightly longer. This was because the vapor produced by the combustion of hydrogen was condensed and moistened the catalyst bed when the temperature of the catalyst bed was lowered after the stopping of the gas supply. However, such lengthening of the time to reach complete combustion could be prevented by drying the catalyst bed at around 120° C. with an electric pre-heater provided with the space heater.

Little degradation in catalytic activity was found even after effecting the aforementioned alternate supplying and stopping operation 150 times.

EXAMPLE 14

To 500 ml of an aqueous 1 N NaOH solution containing 25.3 g of $KMnO_4$, 500 ml of an aqueous solution containing 68.9 g of hexahydrated manganese nitrate ($Mn(NO_2)_2 \cdot 6H_2O$) was added gradually while under continued agitation. The precipitate of manganese dioxide which was consequently produced was washed, separated by filtration, and dried at 120° C. for 12 hours. The dried manganese dioxide was finely powdered to a particle size finer than 200 mesh and the powdered catalyst was dispersed in 1 liter of an aqueous solution containing 284 g of sodium carbonate. To the resultant aqueous dispersion, 1 liter of an aqueous solution containing 582 g of hexahydrated cobalt nitrate and 17 g of silver nitrate were gradually added while under continued agitation. The agitation of the mixture was further continued for ten hours after the addition was completed. The precipitate which was consequently formed was washed, separated by filtration, dried at 120° C. for five hours and then finely divided. About 200 g of the powder was blended with 2 g of polyvinyl alcohol. The mixture was shaped in the form of a honeycomb (150×150×20 mm) and burnt at 600° C. for five hours. Consequently there was obtained a porous catalyst weighing 190 g and possessing the form of a honeycomb.

What is claimed is:

1. A catalyst for the catalytic combustion of hydrogen, comprising;
    a composite oxide of silver and at least one oxide of a metal selected from the group consisting of cobalt and manganese supported on a carrier of ceramic wool, foamed ceramic or foamed metal, the content of said silver falling within the range of 1 to 50 atom%.

* * * * *